July 22, 1958 — J. H. BEVERIDGE — 2,844,131
RECIPROCATING PISTON MACHINE
Filed April 16, 1956 — 10 Sheets-Sheet 1

INVENTOR.
John Herbert Beveridge
BY Warren T. Jessup
Attorney

July 22, 1958     J. H. BEVERIDGE     2,844,131
RECIPROCATING PISTON MACHINE
Filed April 16, 1956     10 Sheets-Sheet 2

FIG 4

INVENTOR.
John Herbert Beveridge
BY Warren T. Jessup
Attorney

FIG 5

July 22, 1958 J. H. BEVERIDGE 2,844,131
RECIPROCATING PISTON MACHINE
Filed April 16, 1956 10 Sheets-Sheet 4

FIG 6

INVENTOR.
John Herbert Beveridge
BY Warren T. Jessup
Attorney

July 22, 1958 J. H. BEVERIDGE 2,844,131
RECIPROCATING PISTON MACHINE
Filed April 16, 1956 10 Sheets-Sheet 5

INVENTOR.
John Herbert Beveridge
BY Warren T. Jessup
Attorney

July 22, 1958 J. H. BEVERIDGE 2,844,131
RECIPROCATING PISTON MACHINE
Filed April 16, 1956 10 Sheets-Sheet 10

INVENTOR.
John Herbert Beveridge
BY
Warren T. Jessup
Attorney

United States Patent Office 2,844,131
Patented July 22, 1958

2,844,131

RECIPROCATING PISTON MACHINE

John Herbert Beveridge, Duarte, Calif.

Application April 16, 1956, Serial No. 578,373

14 Claims. (Cl. 123—73)

My invention relates to reciprocating piston machines in which the piston, the cylinder, the connecting rod, the crankshaft and the crankcase form the elements of an oscillating vane machine.

An object of my invention is the design, construction and arrangement of components of a reciprocating piston machine in such a manner so as to increase the aspirating or breathing capacity per cycle to a breathing capacity substantially in excess of the volumetric displacement of the piston per cycle.

It is another object of my invention to achieve the above mentioned increase in breathing capacity with the use of auxiliary machinery, without materially increasing the number of moving parts and without materially affecting the weight, physical size, efficiency and cost of the machine.

For similar reciprocating piston machines the maximum power output is proportional to the maximum breathing capacity per cycle and the maximum number of cycles per unit of time. The maximum breathing capacity per cycle is proportional to the volumetric displacement of the piston per cycle, whereas the maximum number of cycles per unit time a machine is capable of depends primarily upon the mechanical strength and load carrying ability of the components of the machine.

In substantially all of the present day reciprocating piston machines a crankshaft and a connecting rod are used to transmit power to or away from the piston from outside the machine. Since a crankshaft, a connecting rod, and the structure surrounding these components is inherent in reciprocating piston machines it would be desirable to have these components function in such a manner that they effectively increase the breathing capacity per cycle of a machine having a given volumetric piston displacement.

In crankcase scavenged two-cycle internal combustion engines, the volumetric displacement of the piston with respect to the crankcase induces the new charge for each cycle. In this type of reciprocating piston machine no effort is made to make the volume of charge handled per cycle greater than the volumetric displacement of the reciprocating piston.

Some internal combustion engines are supercharged to effectively increase the breathing capacity per cycle, however this requires auxiliary equipment which is generally expensive, complicated and often unreliable.

Prior art engines of the general type herein disclosed place severe restrictions on the shape of the connecting rod, the location of the axis of the cylinder with respect to the crankcase and upon the height of the engine. Furthermore, if an engine were made to these stringent design requirements, normal wear in the cylinder, on the piston, on the piston pin bearing and on the connecting rod crankpin bearing would destroy the close clearance required between one surface of the connecting rod and the crankcase. Without this close clearance to form a seal, very little benefit can be obtained from the design.

In addition to the above mentioned difficulties there is an undesirable basic limitation of the design. This limitation is that the seal between the connecting rod and crankcase is broken by the natural movements of the connecting rod a few degrees after the bottom-dead-center position of the piston. Since normal two-cycle engine port timing is such that the cylinder inlet port is closed approximately 50° after bottom-dead-center, it is obvious that the seal between the connecting rod and crankcase cannot be maintained to the end of the scavenging period, and therefore the design is not satisfactory for engines incorporating normal cylinder inlet port timing. If the cylinder inlet port were closed before the connecting rod-to-crankcase seal were broken, an undesirably large crankcase clearance volume would exist. Such a large crankcase clearance volume would reduce the capacity and efficiency of the scavenging pump or compressor to such an extent that very little benefit would be obtained from the design.

My invention overcomes the above discussed difficulties inherent in presently known crankcase compressor reciprocating piston machines.

In accomplishing these and other objects, I have provided improved details of structure, exemplary forms of which are illustrated in the accompanying drawings, wherein.

Figures 1, 2, 3:
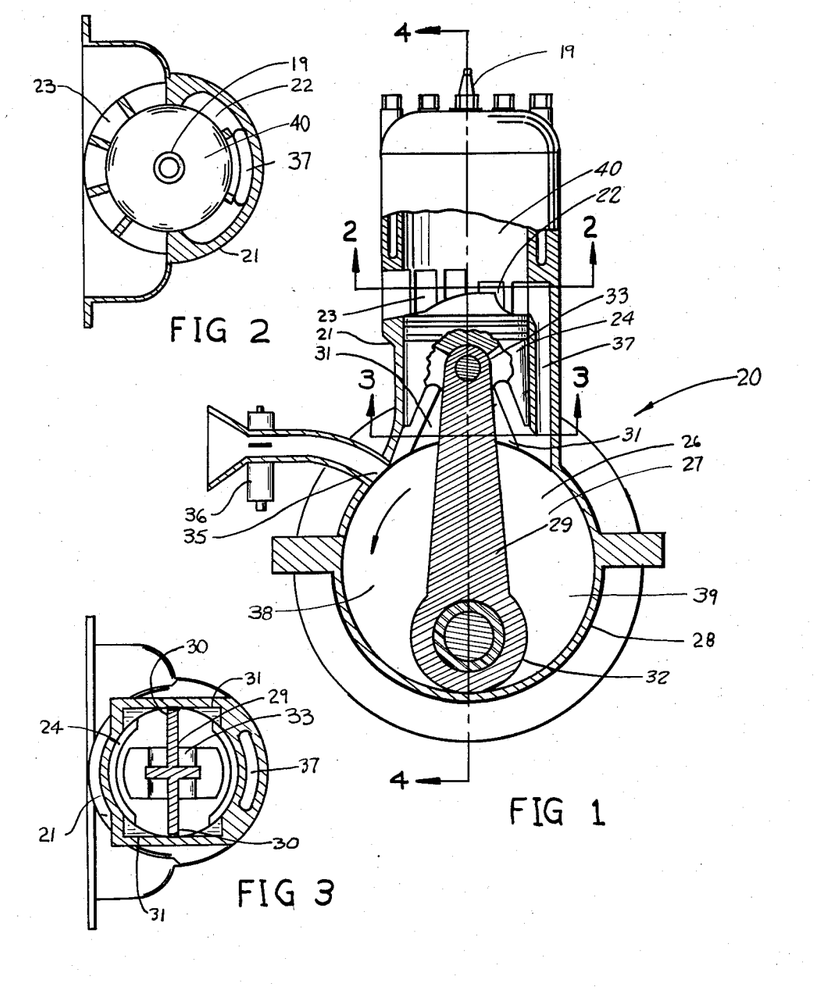
Fig. 1 is a longitudinal section, a single-cylinder, two-cycle internal combustion engine in a plane perpendicular to the axis of the crankshaft and through the axis of the cylinder.
Fig. 2 is a section on line 2—2 of Fig. 1.
Fig. 3 is a section on line 3—3 of Fig. 1.
Figure 4:
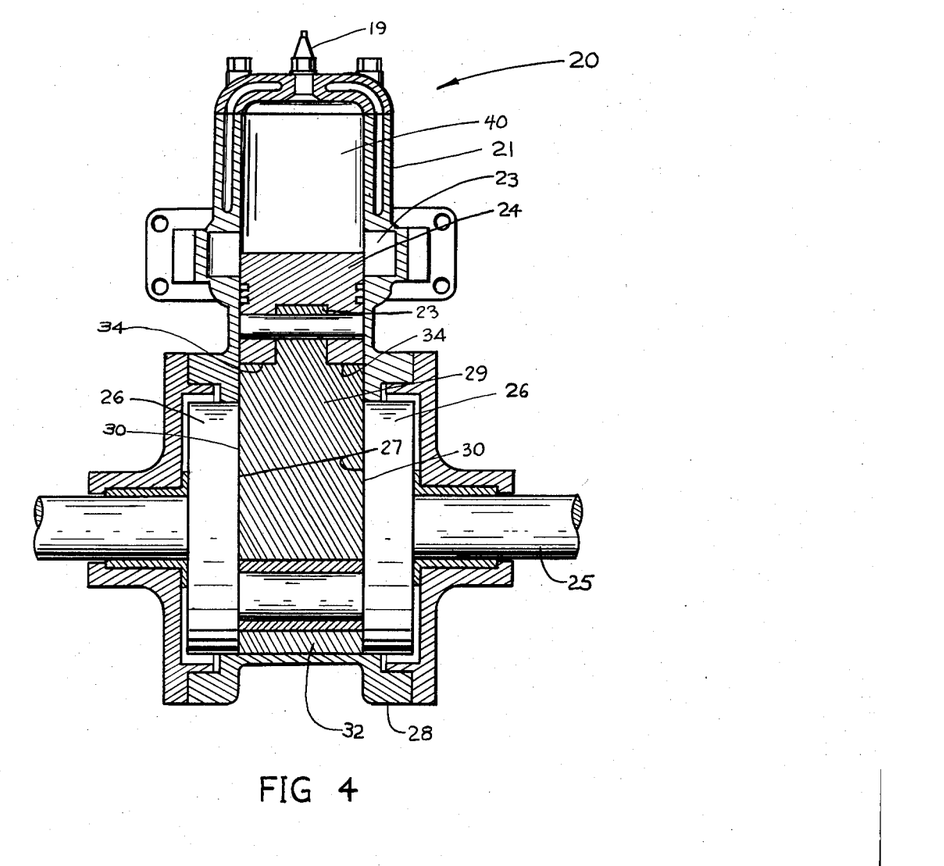
Fig. 4 is a section on line 4—4 of Fig. 1.

In Figs. 1, 2, 3 and 4, I have shown an embodiment of a two-cycle internal combustion engine designated generally as 20. The engine 20 comprises a cylinder 21 having inlet ports 22 and exhaust ports 23 which are periodically opened and closed by the reciprocating motion of the piston 24. The crankshaft 25, rotatably mounted within the crankcase 28, has full circular webs or discs 26 which have their inner faces or surfaces 27 machined so they are flush or aligned with the bore of the cylinder at its maximum dimensions in the planes perpendicular to the axis of the crankshaft. The peripheries of the webs are machined to allow no more than a close clearance in the crankcase 28. The crankshaft turns in a counterclockwise direction (Fig. 1).

The connecting rod 29 is pivotally connected at the upper end to the piston 24, and at the lower end to the crankshaft 25. The connecting rod 29 is substantially as wide as the bore of the cylinder or the distance between the inner faces of the crankshaft webs. The side edges of the connecting rod 30 form a close clearance with respect to the adjacent or inner surfaces of the crankshaft webs 27 and the inner surface of the wall of the cylinder. The cylinder wall has diametric reliefs 31 machined in it to prevent interference between the side edges of the connecting rod 30 and cylinder wall. The diametric cylinder reliefs 31, hereinafter referred to as reliefs, are flush with the inner faces of the crankshaft webs 27. The connecting rod 29 has a circular crankpin end 32 which has no more than a close clearance with respect to the inner surface of the crankcase 28 during a portion of each revolution of the crankshaft 25. In addition, the piston pin end of the connecting rod 33 is circular and forms a close clearance with respect to the inside or underside of the piston 24. Furthermore, the upper ends of the connecting rod side webs 34 form a close clearance with respect to the piston 24.

Thus, there is formed partition means, including the connecting rod 29, said partition means divides the chankchamber or the interior of the crankcase and the interior of the cylinder below the piston into two mutually isolated compartments or chambers during a portion of each revolution of the crankshaft. One chamber, 38, is on the left hand side of the connecting rod 29 and one chamber 39, is on the right hand side of the connecting rod 29.

The crankcase 28 is provided with a charge inlet port or crankcase port 35. In communication with the crankcase port 35 is carburetor 36. A transfer passage 37 extends between the interior of the crankcase or crankchamber and the cylinder inlet ports 22. The cylinder 21 is fitted with a spark plug 19 for ignition of the charge.

OPERATION

In operation when the piston 24 is at the top of its stroke, the entire crankchamber, or interior of the crankcase, is in communication with the interior of the cylinder below the piston and the crankcase port 35. This condition exists during the downstroke of the piston until the crankpin end of the connecting rod 32 passes the crankcase port 35. At this point the connecting rod 29 and piston 24 divide the interior of the crankcase and the interior of the cylinder below the piston into two chambers or two compartments. One chamber, designated 38, is associated with the crankcase port 35 and the other chamber, designated 39, is associated with the transfer passage 37. This condition is maintained until the crankshaft 25, connecting rod 29 and piston 24 reach a predetermined position, which is usually after the scavenging process is over.

It is apparent that during the downstroke of the piston, after the crankpin end of the connecting rod 32 has passed the crankcase port 35, the chamber 38 associated with the crankcase port 35 is continuously increasing in volume and the chamber 39 associated with, or in communication with, transfer passage 37 is continuously decreasing in volume. The continuously changing volumes of the two chambers 38 and 39 produce the pumping or compressing action of the crankcase compressor.

The cylinder scavenging process commences during the downstroke of the piston when the piston 24 uncovers the cylinder inlet ports 22. Charge compressed in the chamber 39 flows through the transfer passage 37 and the cylinder inlet ports 22 thereby scavenging the interior of the cylinder above the piston 40. The scavenging process continues until the piston 24 covers the cylinder inlet ports 22 on the upstroke of the piston 24.

The chamber 39 associated with or in communication with the transfer passage 37, i. e., the crankcase compressor clearance volume continues to decrease in volume for an interval after the bottom-dead-center position of the piston even though the piston 24 has commenced its upstroke due to the motion or displacement of the connecting rod 29 compared to the motion or displacement of the piston 24. This occurs because the crankpin end of the connecting rod 32 is moving rapidly to the right causing the crankcase compressor clearance volume 39 to decrease while the piston 24 is slowly rising in the cylinder 21 tending to cause the clearance volume 39 to increase.

At some position, usually after the scavenging process is over, the chamber 39 associated with the transfer passage 37 begins to increase in volume because of the relative motions or displacements of the connecting rod 29 and the piston 24 during the latter portion of the upstroke of the piston 24. When this condition is reached, or shortly thereafter, the close clearance between the bottom or crankpin end of the connecting rod 32 and the inner surface of the crankcase 28 is broken and the cycle is concluded when the piston reaches top-dead-center position. Thus, the piston and the connecting rod function as a unit within the cylinder and crankcase to divide the interior of the cylinder below the piston and the interior of the crankcase into two mutually isolated chambers during a portion of each revolution of the crankshaft.

By proper choice of the bore of the cylinder, the stroke of the piston and the diameter of the crankpin end of the connecting rod, the desired quantity of scavenging charge may be obtained.

Second form

In Figs. 5, 6, 7 and 8, I have shown a second embodiment of my invention in the form of a two-cycle internal combustion engine. This engine, designated generally as 41, operates on principles similar to those of the above described two-cycle internal combustion engine 20. The engine 41, incorporates two opposed pistons in the same cylinder, and comprises a cylinder 42 having inlet ports 43 and exhaust ports 44 which are periodically opened and closed by the motions of their respective pistons 45 and 46. Rotatably mounted within each crankcase 52 and 53 are a pair of crankshafts 47 and 48, each crankshaft having a full circular web 49 and 51. These crankshaft webs 49 and 51 have their inner faces machined so that they are flush or aligned with the bore of the cylinder at its maximum dimensions in a plane perpendicular to the crankshaft's axis. The periphery of each web is machined to allow no more than a close clearance within its respective crankcase 52 or 53.

Figure 5:
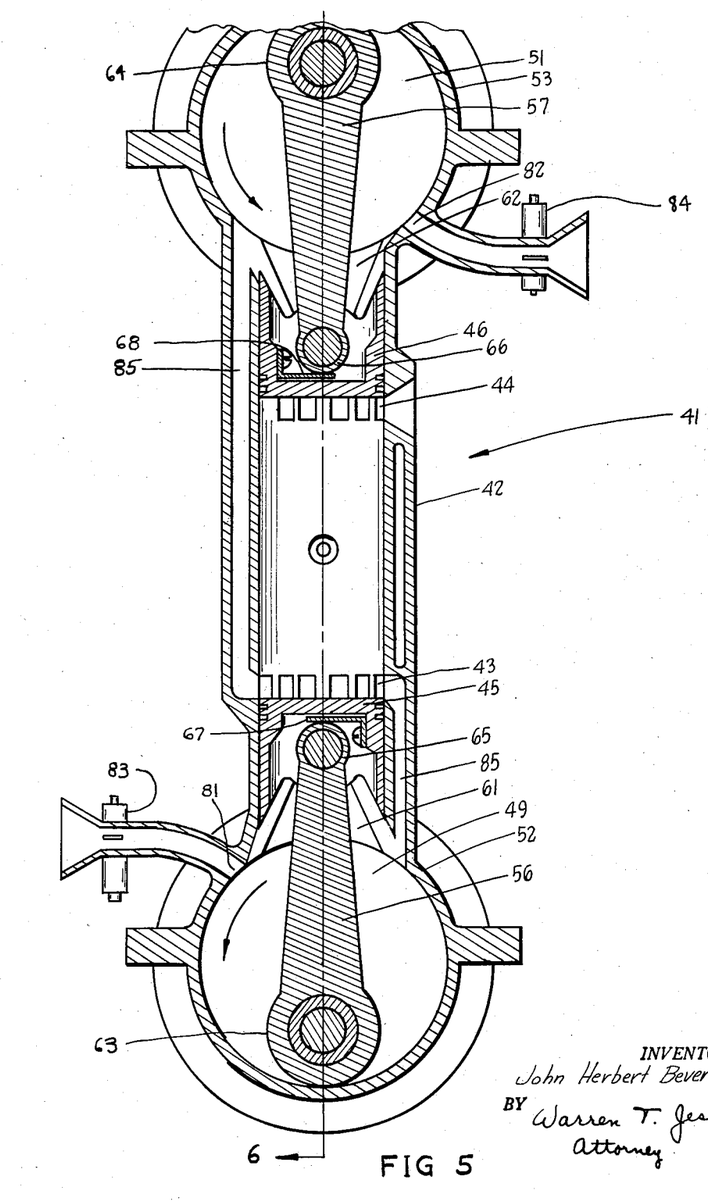
Fig. 5 is a longitudinal section of a second form of my invention showing a single cylinder, opposed piston, two-cycle internal combustion engine in a plane perpendicular to the axis of the crankshaft and through the axis of the cylinder.
Figure 6:
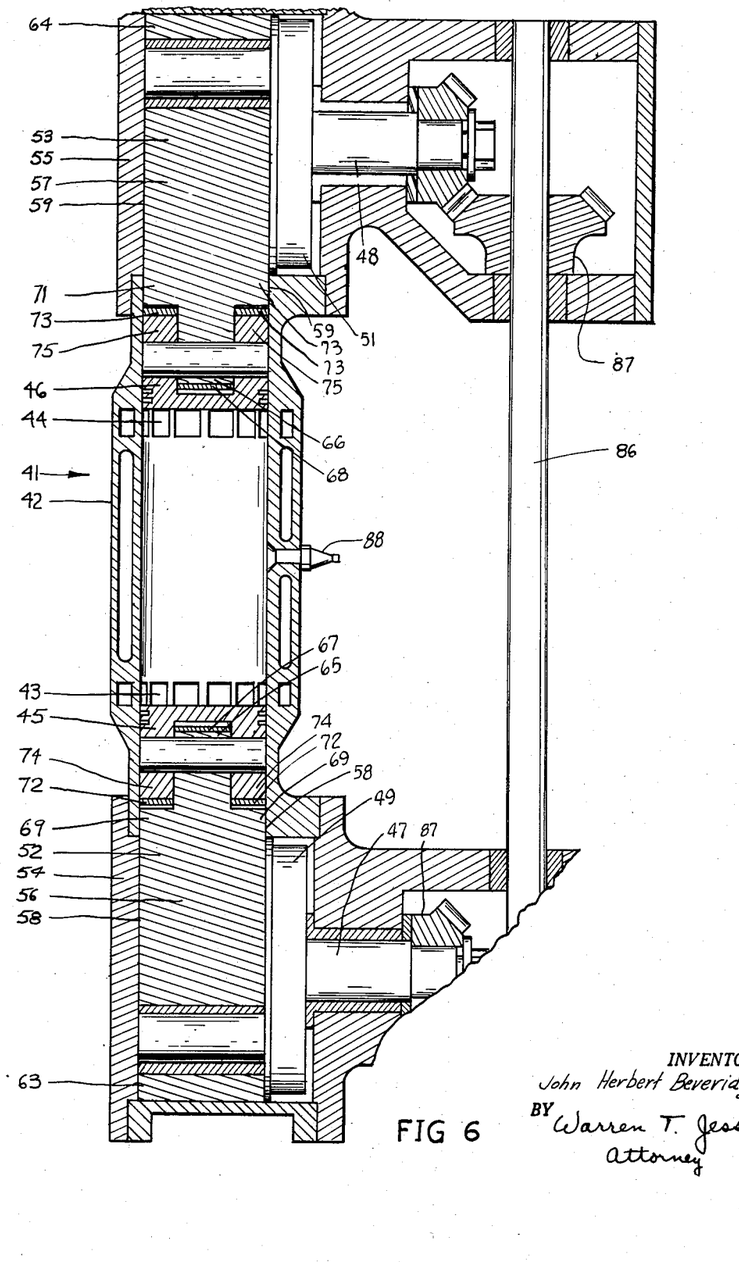
Fig. 6 is a section on line 6—6 of Fig. 5.

The crankcases 52 and 53 are fitted with end covers 54 and 55 which have their inner faces machined flush with the bore of the cylinder on the side opposite to the crankshaft webs 49 and 51. The spaces between the crankshaft webs and the corresponding crankcase end covers constitute crankchambers.

The connecting rods 56 and 57 are pivotally connected to their respective pistons at one end and to their respective crankshafts at the other end. Also, the connecting rods 56 and 57 are substantially as wide as the bore of the cylinder or the distance between the inner faces of the crankshaft webs and their corresponding crankcase end covers. The side edges of the connecting rods 58 and 59 form a close clearance with respect to the inner surfaces of the crankshaft webs, the inner surfaces of the crankcase end covers and the inner surface or wall of the cylinder. The wall of the cylinder has diametric reliefs 61 and 62 machined in it to prevent interference with the side edges of the connecting rods 58 and 59.

Figure 7:
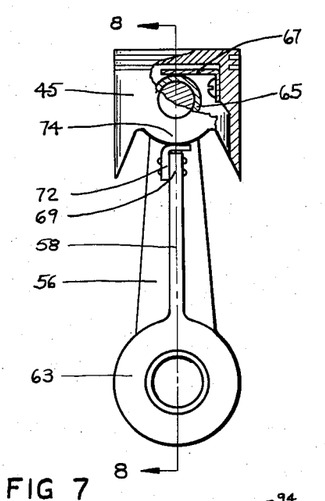
Fig. 7 is an external side view of one of the pistons and connecting rods shown in Fig. 5.
Figure 8:
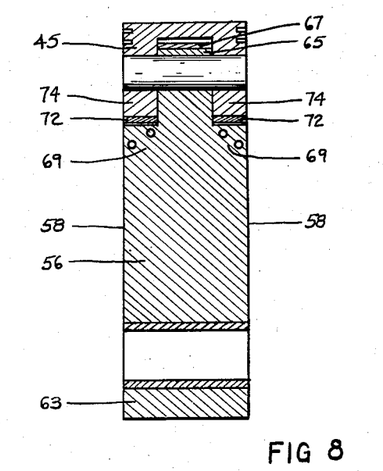
Fig. 8 is a section on line 7—7 of Fig. 7. The cross-section is in a plane parallel to the axis of the piston and through the axis of the piston pin.

The connecting rods 56 and 57 have cylindrical crankpin ends 63 and 64 which form close clearances with respect to the inner surfaces of their respective crankcases 52 and 53 during a portion of each revolution of their respective crankshafts 47 and 48. In addition, the piston pin end of the connecting rods 65 and 66 slide in rubbing contact with flexible sealing members 67 and 68. The flexible sealing members 67 and 68 constitute partition elements which together with the rods 56 and 57, respectively, comprise partition means dividing their respective crankchambers and lower cylinder volumes into two parts. Other sections of the flexible sealing members are fastened directly to each of the connecting rod side webs 69 and 71. These sections of the flexible sealing members 72 and 73 slide in rubbing contact on the piston pin bosses of each piston 74 and 75.

The crankcases 52 and 53 are provided with charge inlet ports 81 and 82. In communication with each crankcase charge inlet port are carburetors 83 and 84. A transfer passage 85 extends between the interior of each crankcase or the interior of each cylinder below its piston and the cylinder inlet ports 43. A drive shaft 86 synchronizes the two crankshafts 47 and 48 through the gear sets 87. The cylinder 42 is fitted with a spark plug 88 for ignition of the charge.

The operation of the opposed piston two-cycle internal combustion engine 41 is very similar to the operation of the single cylinder two-cycle internal combustion engine 20. The primary difference is that the scavenging fluid is compressed simultaneously in each crankcase and is discharged through a common set of inlet ports 43 via the transfer passage 85. The primary advantages of the opposed piston internal combustion engine 41 are excellent scavenging of the interior of the cylinder between the pistons, the possibility of supercharging the cylinder when proper port timing is incorporated in the engine design, and excellent mechanical balance of the engine.

Third form

Figure 9:
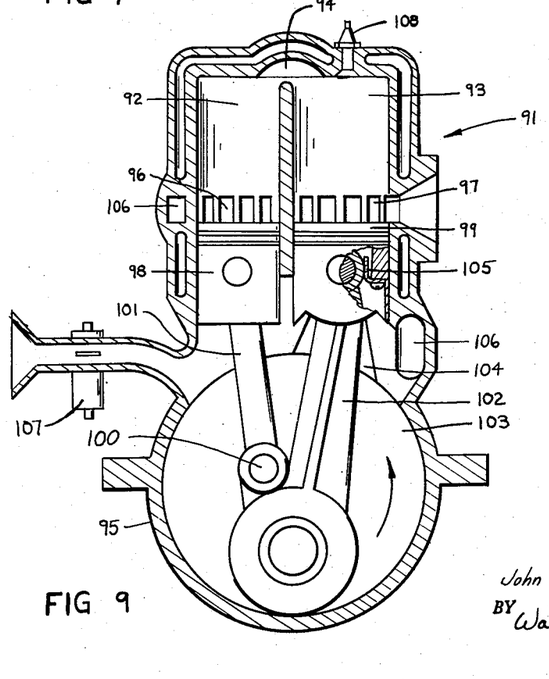
Fig. 9 is a longitudinal section of a third form of my invention showing a two-cylinder, two-cycle, internal combustion engine in a plane perpendicular to the axis of the crankshaft and through the axis of both cylinders.

In Fig. 9 I have shown a third embodiment of my invention in the form of a two-cycle internal combustion engine designated generally as 91. This engine is substantially similar to the engine 20. The engine 91 comprises two cylinders 92 and 93 interconnected at the upper end by passage 94 and each in communication with a common crankcase 95 at the lower end. One cylinder 92 has inlet ports 96 and will be hereafter referred to as the inlet cylinder. The other cylinder 93 has exhaust ports 97 and will hereafter be referred to as the exhaust cylinder.

Two pistons 98 and 99 are reciprocable within their respective cylinders 92 and 93. Two connecting rods 101 and 102 are pivotally connected at one end to their respective pistons 98 and 99 and at the other end to the crankshaft 103. Connecting rod 101 is connected to the crankshaft 103 through the articulating pin 100. The crankshaft 103 rotatably mounted within the crankcase 95 turns in a counterclockwise direction. The connecting rod 102 is substantially as wide as the bore of the exhaust cylinder 93. The exhaust cylinder has diametrical reliefs 104 machined in it to prevent interference between the cylinder wall and the side edges of said one connecting rod. A partition element 105 extends between the piston 99 and the connecting rod 102. The partition element and the connecting rod 102 divide the interior of the crankcase and the lower cylinder volume of the exhaust cylinder into two mutually isolated chambers during a portion of each revolution of the crankshaft 103. A transfer passage 106 connects the interior of the crankcase on the side opposite the carburetor 107 to the inlet ports 96. The exhaust cylinder 93 is fitted with a spark plug 103 for ignition of the charge.

The operation of the engine 91 is substantially similar to the engine 20. The primary advantage of the engine 91 is improved scavenging of the interior of the cylinders above the pistons and the possibility of supercharging.

Fourth form

Figure 10:
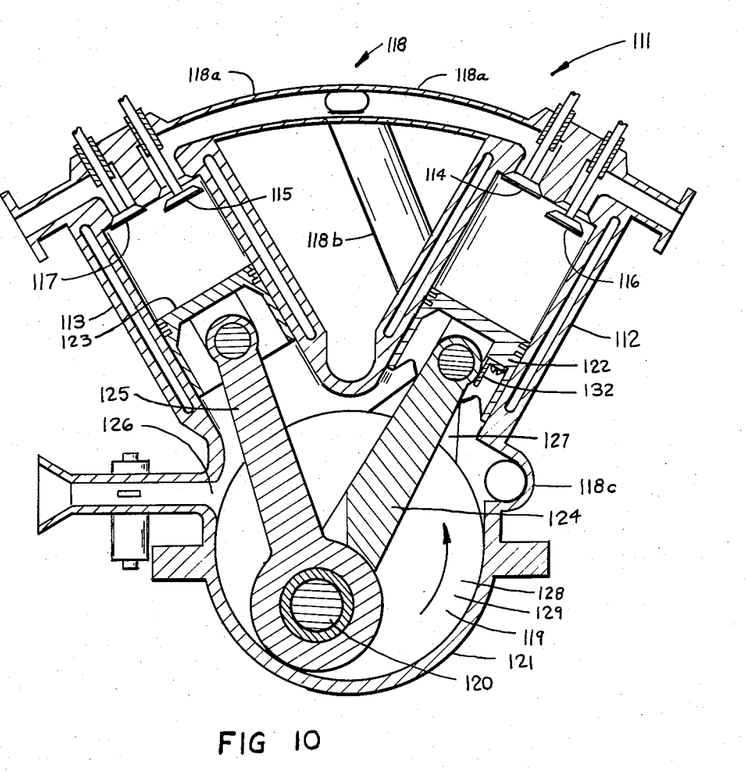
Fig. 10 is a longitudinal section of a fourth form of my invention showing a two-cylinder, four-cycle internal combustion engine in a plane perpendicular to the axis of the crankshaft and through the axis of both cylinders.

In Fig. 10 I have shown a fourth embodiment of my invention in the form of a supercharged two-cylinder four-cycle internal combustion engine. The engine designated generally as 111 is very similar to the engine 91 except that the cylinders 112 and 113 are separated at the top. Each cylinder has an inlet valve 116 and 117. The inlet valves are interconnected with the crankcase 121 by means of the transfer passage 118, which is composed of three portions, 118a, 118b and 118c. The crankshaft 119 rotates in a counterclockwise direction within the crankcase 121. The pistons 122 and 123 are reciprocable within their respective cylinders 112 and 113.

Each connecting rod 124 and 125 is pivotally connected at one end to the crankshaft 119 at the common crankpin 120, and at the opposite end to its respective piston 122 or 123. The connecting rod 124, opposite to the crankcase inlet port 126, is substantially as wide as the bore of its respective cylinder 112. The cylinder 112 has diametrical reliefs 127 machined in it to prevent interference with the side edges of said one connecting rod 124. The crankshaft webs 128 have their inner faces 129 machined flush or aligned with the diametrical reliefs 127 of the cylinder 112. The innerfaces of the crankshaft webs 129 adjacent each side of said one connecting rod 124 form a close clearance with respect to the side edges of said one connecting rod 124. The space between the inner faces of the crankshaft webs 129 is sometimes referred to as the crankchamber.

A partition element 132 extending between the piston 122 and the connecting rod 124 along with the connecting rod forms a partition dividing the crankchamber and the interior of the cylinder below the piston 122 into two mutually isolated compartments during a portion of each revolution of the crankshaft 119.

During operation, the fluid compressed every two revolutions of the crankshaft 119 is discharged alternately to the interior of each of the cylinders 112 and 113 via the alternately opened inlet valves 114 and 115. Since the volumetric displacement of either one of the pistons 121 or 122, is less than the volumetric displacement of the crankcase compressor the engine may be supercharged.

Fifth form

Figure 11:
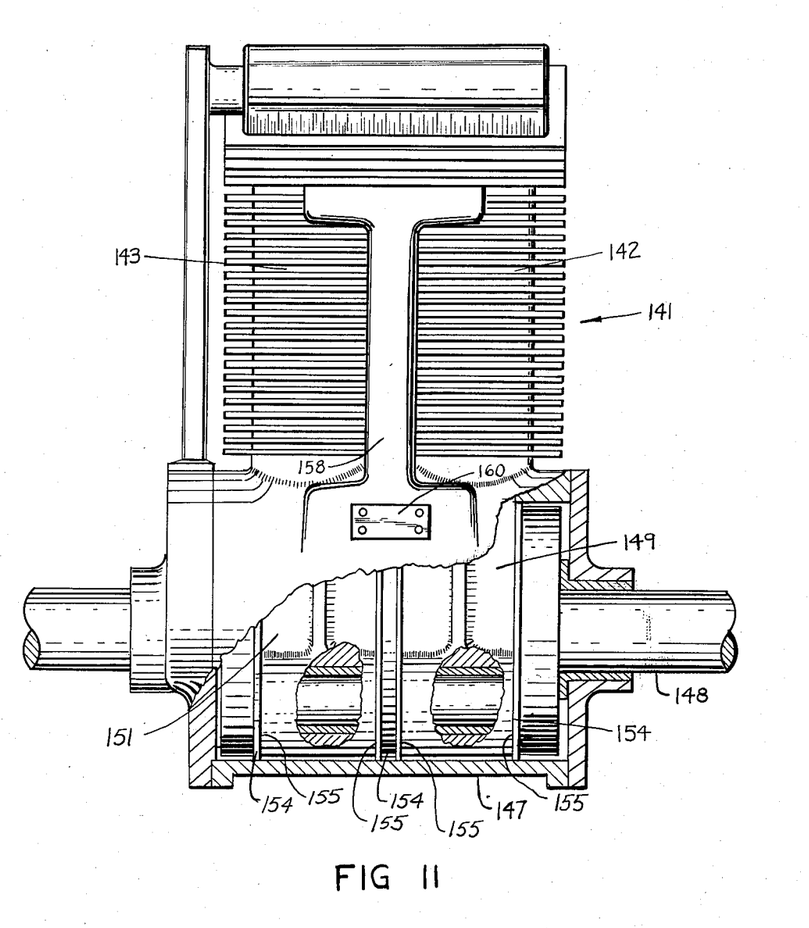
Fig. 11 is an external side view of a fifth form of my invention showing a two-cylinder, four-cycle internal combustion engine.

In Fig. 11 I have shown a fifth embodiment of my invention. This embodiment designated generally as 141 is a two cylinder, four-cycle internal combustion engine. This engine 141 is substantially similar to the engine 111 of Fig. 10 except that this engine has two crankcase compressors operating in parallel to supercharge the engine cylinders. A cross section through the centerline of either cylinder perpendicular to the axis of the crankshaft would be substantially similar to Fig. 12 with the omission of the transfer valve 174.

The engine 141 comprises two cylinders 142 and 143. Cylinder 142 has an inlet valve, an exhaust valve and a piston reciprocable therein. Cylinder 143 has an inlet valve, an exhaust valve and a piston reciprocable therein which are like the corresponding components in cylinder 142. In communication with cylinders 142 and 143 is a common crankcase 147. A crankshaft 148 is rotatably mounted within the crankcase 147 and turns in a counterclockwise direction looking at the engine from the left. There are two connecting rods 149 and 151 each pivotally connected to the crankshaft at one end and to their respective pistons at the other end. Both connecting rods 149 and 151 are substantially as wide as the bore of their respective cylinders 142 and 143. Each of the cylinders has diametrical reliefs to prevent interference with the side edges of their respective connecting rods 149 and 151.

The crankshaft 148 has webs 154 adjacent each side of each connecting rod. The inner faces 155 of each of the webs 154 are machined smooth and are aligned or flush with the diametrical reliefs in each of the cylinders 142 and 143. Each connecting rod 149 and 151 forms a partition dividing the interior of its respective portion of the crankcase or crankchamber into two mutually isolated compartments during a portion of each revolution of the crankshaft 148. A partition element forms a seal in the channel or gap between the right piston and its respective connecting rod 149. There is another partition element between the other piston and its corresponding connecting rod 151. The former partition element and its respective connecting rod 149 from a partition dividing the interior of their respective cylinder below its respective piston into two mutually isolated compartments communicating respectively with the two compartments of their respective crankchamber. The other partition element and its corresponding connecting rod 151 form a partition dividing the interior of their respective cylinder below its respective piston into two mutually isolated compartments communicating respectively with the two compartments of their respective crankchamber.

Each crankchamber has a port in communication therewith. Connected to each crankchamber port is a carburetor. Also, there is a passage 158 which connects both crankchambers to the inlet valves of both cylinders. A safety valve 160 protects the engine from damage in case of backfire from a cylinder into the passage 158. Both cylinders 142 and 143 are fitted with spark plugs for ignition of the charge.

The operation of this engine 141 is very similar to the operation of engine 111 with the exception that both crankcase compressors operate in parallel and therefore simultaneously supply alternately one then the other cylinder. The primary advantage of this configuration is the high degree of supercharging possible because both crankcase compressors operate in parallel.

Sixth form

Figure 12:
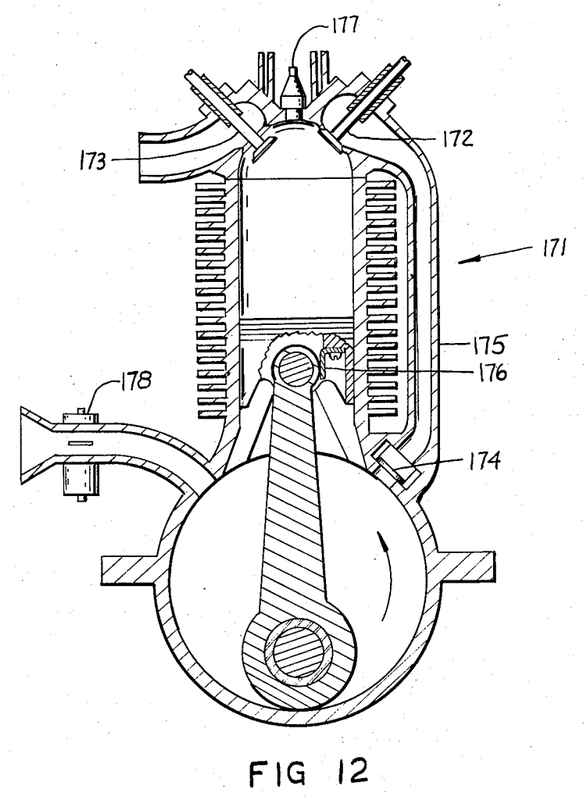
Fig. 12 is a longitudinal section of a sixth form of my invention showing a single cylinder four-cycle internal combustion engine or a longitudinal section of a multiple-stage compressor. The longitudinal section is in a plane through the axis of the cylinder and perpendicular to the axis of the crankshaft.

In Fig. 12 I have shown a sixth embodiment of my invention. In this form the machine may be either a single cylinder four-cycle internal combustion engine or a two-stage gas compressor.

As a single cylinder four-cycle internal combustion engine the machine 171 is substantially similar to the engine 20. The differences are the addition of a cylinder intake valve 172, a cylinder exhaust valve 173 and a transfer valve 174. A transfer passage 175 extends between the transfer valve 174 and the cylinder intake valve 172. The partition element 176 of engine 171 is similar to the partition elements of engine 91.

The operation of engine 171 is similar to existing single cylinder four-cycle internal combustion engines except that before the charge enters the cylinder it is compressed in the crankcase compressor. Each revolution of the crankshaft charge is compressed in the crankcase compressor and is discharged through the transfer valve 174 into the transfer passage 175. Charge is allowed to flow from the transfer passage 175 through the opened intake valve 172 once every other revolution of the crankshaft. The transfer passage volume acts as a reservoir for the charge compressed by the crankcase compressor. The primary advantages of this type of engine are the high degree of supercharge obtainable and the very small clearance volume of the crankcase compressor because of the action of the transfer valve 174. The small clearance volume makes it possible for the crankcase compressor to be very efficient and to operate at maximum capacity per cycle.

For application as a two-stage gas compressor the only modifications necessary are the elimination of the cylinder spark plug 177, elimination of the carburetor 178, and a change in the timing of the cylinder intake valve 172 and the cylinder exhaust valve 173. The cylinder intake valve 172 and exhaust valve 173 allow flow therethrough once each revolution of the crankshaft.

In operation, the gas is first compressed in the crankcase compressor and discharged through the transfer valve 174 into the transfer passage 175. From the transfer passage 175 the gas flows through the inlet valve 172 into the cylinder where the gas is then compressed a second time to a higher pressure in the reciprocating piston compressor and then exhausted at high pressure from the machine. The primary advantage of this type of compressor is relatively large capacity from a small machine for each revolution of the crankshaft. Also, the work of compression is accomplished in a very efficient manner.

Figure 13:
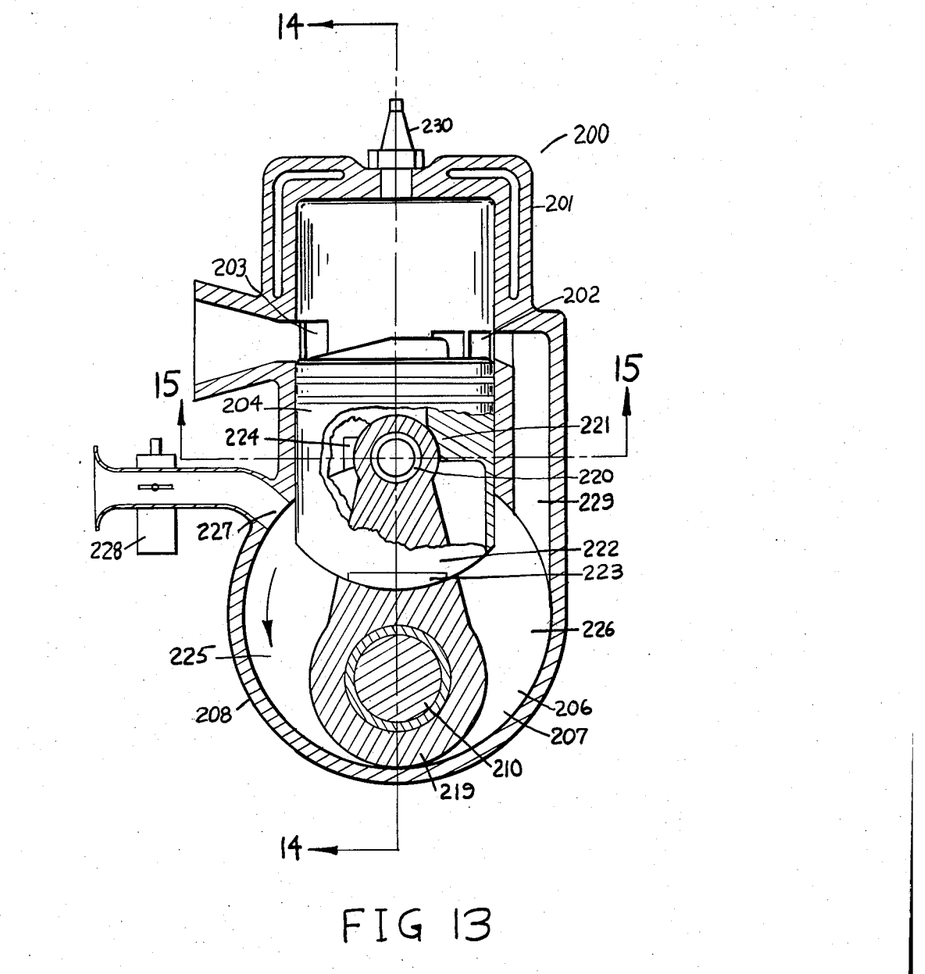
Fig. 13 is a longitudinal section of a seventh form of my invention showing a single-cylinder, two-cycle internal combustion engine in a plane perpendicular to the axis of the crankshaft and through the axis of the cylinder.
Figure 14:
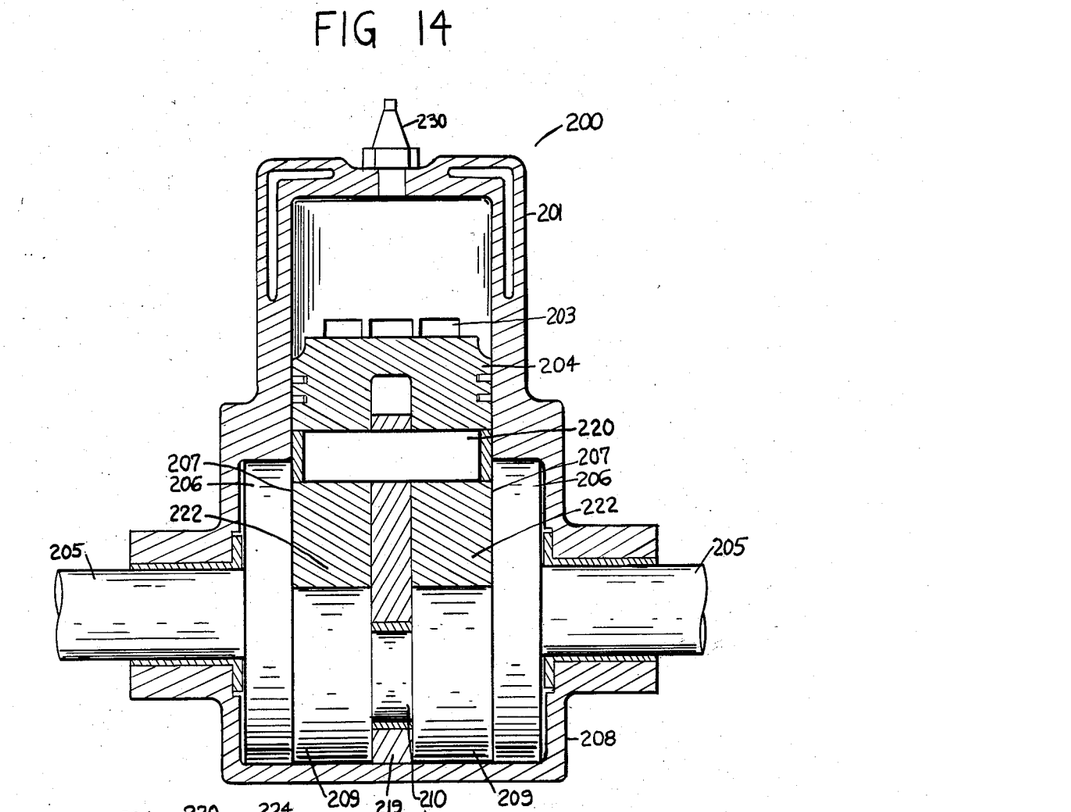
Fig. 14 is a section on line 14—14 of Fig. 13.
Figure 15:
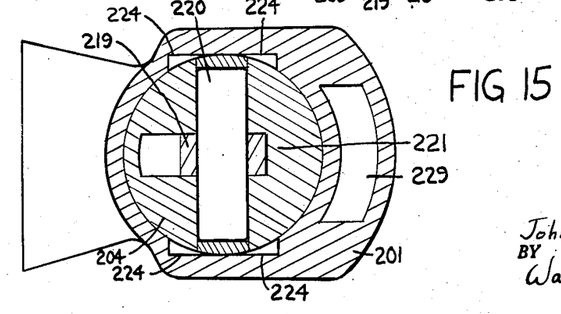
Fig. 15 is a section on line 15—15 of Fig. 13.

In Figs. 13, 14, and 15, I have shown a seventh embodiment of my invention in the form of a single cylinder two-cycle internal combustion engine designated generally as 200. The engine 200 comprises a cylinder 201 having inlet ports 202 and exhaust ports 203 which are periodically opened and closed by the reciprocating motion of the piston 204. The crankshaft 205 rotatably mounted within the crankcase 208 has full circular webs or discs 206 which have their inner faces or surfaces 207 machined so they are flush or aligned with the bore of the cylinder at its maximum dimensions in the planes perpendicular to the axis of the crankshaft. The peripheries of the webs are machined to allow no more than a close clearance in the crankcase 208. The crankshaft webs 206 are connected together by the crank throws 209 and the crankpin 210. The axis of the crankpin is concentric with the axis of the crank throws. The crank throws are machined to a diameter which allows no more than a close clearance with respect to the inner surface of the bore of the crankcase.

The connecting rod 219 is pivotally connected at the upper end to the piston pin 220 and at the lower end to the crankshaft 205 at the crankpin 210. The crankpin end of the connecting rod is substantially as wide as the length of the crankpin or the distance between crank throws. The side edges of the crankpin end of the connecting rod form a close clearance with respect to the end surfaces of the crank throws. The connecting rod, 219, has a circular crankpin end which has no more than a close clearance with respect to the inner surface of the crankcase.

The piston 204 has a central slot to accept the piston pin end of the connecting rod. The piston pin end of the connecting rod is substantially as wide as the central slot in the piston. The side edges of the piston pin end of the connecting rod form a close clearance with respect to the sides of the central slot in the piston. The connecting rod 219, has a circular piston pin end which has no more than a close clearance with respect to a partition, 221, in the central slot of the piston.

The piston, 204, has radiused lower piston pin bosses 22 which extend down to form a close clearance with respect to the crank throws 209. Also the lower piston pin bosses 222, each have a raised flat 223 on the lowermost portion of the outside of the piston in planes normal to the axis of the crankshaft. The cylinder bore has diametric reliefs 224 machined in it to prevent interference with the flats on the exterior of the piston when the piston is near the top of its stroke.

Thus, there is formed partition means including the connecting rod 219, the crankshaft 205, and the piston 204, said partition means divides the crankchamber or the interior of the crankcase and the interior of the cylinder below the piston into two mutually isolated compartments or chambers during a portion of each revolution of the crankshaft. One chamber 225 is on the left hand side of the connecting rod 219, and the other chamber 226 is on the right hand side of the connecting rod 219.

The crankcase 208 is provided with a charge inlet port or crankcase inlet port 227. In communication with the crankcase port 227 is a carburetor 228. A transfer passage 229 extends between the interior of the crankcase or crankchamber and the cylinder inlet ports 202. The cylinder 201 is fitted with a spark plug 230 for ignition of the engine.

The operation of the two-cycle internal combustion engine 200 herein described as the seventh form of my invention is substantially the same as the operation of the single-cylinder two-cycle internal combustion engine 20. The engine 200 is different from engine 20 in that the connecting rod may be of practically any width the designer chooses. The maximum width would be the width equal to the cylinder bore and the minimum width would be that dictated by strength considerations of the rod or bearing loading at the ends of the rod. The function of sealing between the two chambers 225 and 226 is shared by the piston 204, the crankthrows 209, the connecting rod 219, and the partition means between the connecting rod and the piston. Several advantages of this configuration are (1) very stiff crankshaft because of the large diameter of the crankthrows 209, (2) light weight connecting rod 219 due to its narrow width and (3) small height of diametric reliefs 224 required in the bore of the cylinder.

This application is a continuation-in-part of my copending application No. 388,346, filed October 26, 1953, now abandoned.

I claim:

1. Apparatus of the class described comprising a cylinder, a crankcase in communication with said cylinder, a piston reciprocable in said cylinder, a crankshaft rotatably mounted within said crankcase, partition means dividing the interior of the crankcase and the interior of the cylinder below the piston into two mutually isolated chambers during a portion of each revolution of the crankshaft, said partition means including a connecting rod pivotally connected at one end to said piston and at the other end to said crankshaft.

2. Apparatus of the class described comprising a cylinder, a crankcase in communication with said cylinder, a piston reciprocable in said cylinder, a crankshaft rotatably mounted within said crankcase, a connecting rod pivotally connected at one end to said piston and at the other end to said crankshaft, said connecting rod being substantially as wide as the bore of said cylinder, said cylinder having reliefs to prevent interference with the side edges of said connecting rod, said connecting rod forming a partition dividing the interior of said crankcase and the interior of the cylinder below the piston into two mutually isolated chambers during a portion of each revolution of said crankshaft.

3. Apparatus of the class described comprising a cylinder, a crankcase in communication with said cylinder, a piston reciprocable in said cylinder, a crankshaft rotatably mounted within said crankcase, a connecting rod pivotally connected at one end to said piston and at the other end to said crankshaft, said connecting rod being substantially as wide as the bore of said cylinder, said cylinder having reliefs to prevent interference with the side edges of said connecting rod, said crankshaft having webs adjacent each side of said connecting rod, the space between said webs constituting a crankchamber, the ends of said crankchamber being flush with said reliefs in said cylinder, said connecting rod forming a partition dividing said crankchamber into two mutually isolated compartments during a portion of each revolution of said crankshaft, said connecting rod forming a partition dividing the interior of the cylinder below the piston into two mutually isolated compartments communicating respectively with the two compartments of the crankchamber, said crankchamber having a port in communication therewith, and transfer passage means between the crankchamber and the interior of the cylinder above the piston.

4. Apparatus of the class described comprising a cylinder, a crankcase in communication with said cylinder, a piston reciprocable in said cylinder, a crankshaft rotatably mounted within said crankcase, a connecting rod pivotally connected at one end to said piston and at the other end to said crankshaft, said connecting rod being substantially as wide as the bore of said cylinder, said cylinder having reliefs to prevent interference with the side edges of said connecting rod, a crankshaft web adjacent one side edge of said connecting rod, a crankcase end cover adjacent the other side edge of said connecting rod, the space between said crankshaft web and the crankcase end cover constituting a crankchamber, the ends of said crankchamber being flush with said reliefs in said cylinder, said connecting rod forming a partition dividing said crankchamber into two mutually isolated compartments during a portion of each revolution of said crankshaft, said connecting rod forming a partition dividing the interior of the cylinder below the piston into two mutually isolated compartments communicating respectively with the two compartments of the crankchamber, said crankchamber having a port in communication therewith, and transfer passage means between the crankchamber and the interior of the cylinder above the piston.

5. Apparatus of the class described comprising a cylinder, a crankcase in communication with said cylinder, a piston reciprocable in said cylinder, a crankshaft rotatably mounted within said crankcase, a connecting rod pivotally connected at one end to said piston and at the other end to said crankshaft, said connecting rod forming a partition dividing the interior of said crankcase into two mutually isolated chambers during a portion of each revolution of said crankshaft, and a partition element between said piston and said connecting rod, said partition element and said connecting rod forming a partition dividing the interior of said cylinder below the piston into two mutually isolated chambers communicating respectively with the two chambers of the crankcase.

6. Apparatus of the class described comprising a cylinder, a crankcase in communication with said cylinder, a piston reciprocable in said cylinder, a crankshaft rotatably mounted within said crankcase, a connecting rod pivotally connected at one end to said piston and at the other end to said crankshaft, said connecting rod being substantially as wide as the bore of said cylinder, said cylinder having reliefs to prevent interference with the side edges of said connecting rod, said connecting rod forming a partition dividing the interior of said crankcase into two mutually isolated chambers during a portion of each revolution of said crankshaft, a partition element between said piston and said connecting rod, said partition element and said connecting rod forming a partition dividing the interior of said cylinder below the piston into two mutually isolated chambers communicating respectively with the two chambers of the crankcase, said crankcase having a port therein, and transfer passage means between the crankcase and the interior of the cylinder above the piston.

7. Apparatus of the class described comprising a cylinder, a crankcase in communication with said cylinder, a piston reciprocable in said cylinder, a crankshaft rotatably mounted within said crankcase, a connecting rod pivotally connected at one end to said piston and at the other end to said crankshaft said connecting rod being substantially as wide as the bore of said cylinder, said cylinder having reliefs to prevent interference with the side edges of said connecting rod, said crankshaft having webs adjacent each side of said connecting rod, the space between said webs constituting a crankchamber, the ends of said crankchamber being flush with said reliefs, said connecting rod forming a partition dividing said crankchamber into two mutually isolated compartments during a portion of each revolution of said crankshaft, and a partition element between said piston and said connecting rod, said partition element and said connecting rod forming a partition dividing the interior of said cylinder below the piston into two mutually isolated chambers communicating respectively with the two compartments of the crankchamber, said crankchamber having a port in communication therewith, and transfer passage means between the crankchamber and the interior of the cylinder above the piston.

8. Apparatus of the class described comprising a cylinder, a crankcase in communication with said cylinder, a piston reciprocable in said cylinder, a crankshaft rotatably mounted within said crankcase, a connecting rod pivotally connected at one end to said piston and at the other end to said crankshaft, said connecting rod forming a partition dividing the interior of the crankcase into two mutually isolated chambers during a portion of each revolution of said crankshaft, a flexible sealing member extending between said piston and said connecting rod, said piston and said connecting rod forming a partition dividing the interior of said cylinder below the piston into two mutually isolated chambers communicating respectively with the two chambers of said crankcase.

9. Apparatus of the class described comprising a cylinder, a crankcase in communication with said cylinder, a piston reciprocable in said cylinder, a crankshaft rotatably mounted within said crankcase, a connecting rod pivotally connected at one end to said piston and at the other end to said crankshaft, said connecting rod being substantially as wide as the bore of said cylinder, said cylinder having reliefs to prevent interference with the side edges of said connecting rod, said connecting rod forming a partition dividing the interior of said crankcase into two mutually isolated chambers during a portion of each revolution of said crankshaft, a flexible sealing member extending between said piston and said connecting rod, said flexible sealing member and said connecting rod forming a partition dividing the interior of said cylinder below the piston into two mutually isolated chambers communicating respectively with the two chambers of said crankcase.

10. Apparatus of the class described comprising a cylinder, a crankcase in communication with said cylinder, a piston reciprocable in said cylinder, a crankshaft rotatably mounted within said crankcase, a connecting rod pivotally connected at one end to said piston and at the other end to said crankshaft, said connecting rod being substantially as wide as the bore of said cylinder, said cylinder having reliefs to prevent interference with the side edges of said connecting rod, said crankshaft having webs adjacent each side of said connecting rod, the space between said webs constituting a crankchamber, the ends of said crankchamber being flush with the reliefs in said cylinder, said connecting rod forming a partition dividing said crankchamber into two mutually isolated compartments during a portion of each revolution of said crankshaft, a flexible sealing member extending between said piston and said connecting rod, said flexible sealing member and said connecting rod forming a partition dividing the interior of said cylinder below the piston into two mutually isolated compartments communicating respectively with the two compartments of said crankchamber, said crankchamber having a port in communication therewith, and transfer passage means between said crankchamber and the interior of the cylinder above the piston.

11. Apparatus of the class described comprising a cylinder having inlet and exhaust valving means, a crankcase in communication with said cylinder, a piston reciprocable in said cylinder, a crankshaft rotatably mounted within said crankcase, transfer passage means between the interior of said crankcase and the inlet valving means, said transfer passage means having a transfer valve adjacent said crankcase, and partition means dividing the interior of said crankcase and the interior of the cylinder below the piston into two mutually isolated chambers during a portion of each revolution of said crankshaft, said partition means including a connecting rod pivotally connected at one end to said piston and at the other end to said crankshaft.

12. Apparatus of the class described comprising a cylinder, a crankcase in communication with said cylinder, a piston reciprocable within said cylinder, a crankshaft rotatably mounted within said crankcase, a connecting rod pivotally connected at one end to said piston and at the other end to said crankshaft and partition means separating the interior of the crankcase and the interior of the cylinder below the piston into two mutually isolated chambers during a portion of each revolution of said crankshaft, said partition means including said connecting rod and a portion of said crankshaft.

13. Apparatus of the class described comprising a cylinder, a piston reciprocable within said cylinder, a crankcase in communication with said cylinder, a crankshaft rotatably mounted within said crankcase, a connecting rod pivotally connected at one end to said piston and pivotally connected at the other end to said crankshaft, said piston having a central slot for insertion of said connecting rod, said piston having its lower pin bosses radiused from the axis of the piston pin hole, said crankshaft having a crankpin, said crankshaft having crank throws which are substantially the same diameter and concentric with the crankshaft end of said connecting rod, and partition means between said piston and the piston pin end of said connecting rod, said connecting rod being substantially as wide as the central slot in the piston at one end and substantially as wide as the crankpin at the crankshaft end, said connecting rod, said crank throws and said partition means between said connecting rod and said piston forming a partition dividing the interior of said crankcase and the interior of the cylinder below the piston into two mutually isolated chambers during a portion of each revolution of said crankshaft.

14. Apparatus of the class described comprising a cylinder, a piston reciprocable within said cylinder, a crankcase in communication with said cylinder, a crankshaft rotatably mounted within said crankcase, a connecting rod pivotally connected at one end to said piston and pivotally connected at the other end to said crankshaft, said piston having a central slot for insertion of one end of said connecting rod, said piston having radiused piston pin bosses, said piston having flat exterior surfaces normal to the axis of the crankshaft on the lower portion of the pin bosses, said cylinder bore having diametric reliefs in the lower portion adjacent to the crankcase to prevent interference with the flat surfaces on the exterior on said piston, said crankshaft having a crankpin, said crankshaft having crank throws which are substantially the same diameter as the crankshaft end of the connecting rod, one end of said connecting rod being substantially as wide as the central slot in said piston and the other end of said connecting rod being substantially as wide as the crankpin, and partition means between said piston and the piston pin end of said connecting rod, said piston, said crank throws and said partition means between said connecting rod and said piston forming a partition dividing the interior of the crankcase and the interior of the cylinder below the piston into two mutually isolated chambers during a portion of each revolution of said crankshaft.

References Cited in the file of this patent

UNITED STATES PATENTS

| 1,217,020 | Laurents | Feb. 20, 1917 |
| 1,229,989 | Low | June 12, 1917 |
| 1,455,787 | Herr | May 22, 1923 |
| 1,542,697 | Hounsfield | June 16, 1925 |
| 1,744,161 | Gillespie | Jan. 21, 1930 |
| 1,795,551 | Giesse | Mar. 10, 1931 |